United States Patent
Stosch et al.

(10) Patent No.: US 12,412,417 B2
(45) Date of Patent: Sep. 9, 2025

(54) CAMERA SYSTEM WITH INTERFERENCE PATTERN SUPPRESSION

(71) Applicants: IFM ELECTRONIC GMBH, Essen (DE); PMDTECHNOLOGIES AG, Siegen (DE)

(72) Inventors: Jan Hinnerk Stosch, Siegen (DE); Stephan Ulrich, Siegen (DE); Oliver Lottner, Netphen (DE)

(73) Assignees: IFM ELECTRONIC GMBH, Essen (DE); PMD TECHNOLOGIES AG, Siegen (DE)

( * ) Notice: Subject to any disclaimer, the term of this patent is extended or adjusted under 35 U.S.C. 154(b) by 0 days.

(21) Appl. No.: 18/693,316

(22) PCT Filed: Sep. 14, 2022

(86) PCT No.: PCT/EP2022/075498
§ 371 (c)(1),
(2) Date: Mar. 19, 2024

(87) PCT Pub. No.: WO2023/046545
PCT Pub. Date: Mar. 30, 2023

(65) Prior Publication Data
US 2024/0406593 A1   Dec. 5, 2024

(30) Foreign Application Priority Data
Sep. 27, 2021   (DE) .................... 10 2021 124 961.9

(51) Int. Cl.
*G06V 40/13* (2022.01)
*G06V 40/12* (2022.01)
(Continued)

(52) U.S. Cl.
CPC .......... *G06V 40/1312* (2022.01); *G06V 40/12* (2022.01); *G06V 40/13* (2022.01);
(Continued)

(58) Field of Classification Search
CPC .... G06V 40/12; G06V 40/13; G06V 40/1312; G06V 40/1318
See application file for complete search history.

(56) References Cited

U.S. PATENT DOCUMENTS

| 2007/0177019 | A1 | 8/2007 | Reichenbach et al. |
| 2011/0160576 | A1 * | 6/2011 | Bower ............... G06V 40/1312 600/425 |

(Continued)

FOREIGN PATENT DOCUMENTS

| CN | 115131215 A | 9/2022 | |
| DE | 102012212787 A1 * | 1/2014 | ............. B62K 21/26 |

(Continued)

OTHER PUBLICATIONS

P. Birajadar, M. Haria, P. Kulkarni, S. Gupta, P. Joshi, B. Singh & V. Gadre, "Towards smartphone-based touchless fingerprint recognition", 44 Sadhana No. 161 (Jun. 13, 2019) (Year: 2019).*

(Continued)

*Primary Examiner* — David N Werner
(74) *Attorney, Agent, or Firm* — LEYDIG, VOIT & MAYER, LTD.

(57) ABSTRACT

A camera system includes a sensor having a plurality of pixels sensitive to electromagnetic radiation; and an evaluator. The sensor is arranged behind a semi-transparent layer. The evaluator is configured to suppress an interference pattern occurring on the sensor by a pixel-by-pixel correction.

11 Claims, 2 Drawing Sheets

(51) Int. Cl.
*H04N 25/617* (2023.01)
*H04N 23/52* (2023.01)

(52) U.S. Cl.
CPC ....... *G06V 40/1318* (2022.01); *H04N 25/617* (2023.01); *H04N 23/52* (2023.01)

(56) References Cited

U.S. PATENT DOCUMENTS

| | | | |
|---|---|---|---|
| 2017/0039410 A1* | 2/2017 | Pi | G06F 3/017 |
| 2017/0076133 A1* | 3/2017 | Hillmann | G06V 40/1312 |
| 2017/0161544 A1* | 6/2017 | Fomani | G01J 1/0488 |
| 2018/0046281 A1* | 2/2018 | Pi | G06V 40/1318 |
| 2019/0026527 A1* | 1/2019 | He | G02B 6/0026 |
| 2019/0303639 A1* | 10/2019 | He | G09G 3/3208 |
| 2020/0218392 A1* | 7/2020 | He | G06V 40/1312 |
| 2020/0279090 A1* | 9/2020 | He | G06V 40/1318 |
| 2020/0380236 A1* | 12/2020 | He | G06F 3/044 |
| 2020/0387688 A1* | 12/2020 | Park | G06V 40/1335 |
| 2021/0029336 A1 | 1/2021 | Liu et al. | |
| 2021/0150176 A1 | 5/2021 | Song et al. | |
| 2023/0325979 A1 | 10/2023 | Lan et al. | |

FOREIGN PATENT DOCUMENTS

| | | |
|---|---|---|
| DE | 102020122224 A1 | 5/2021 |
| WO | WO 2021/020821 A1 | 2/2021 |

OTHER PUBLICATIONS

T. Pribanic, T. Petkovic, M. Donlic, V. Angladon, & S. Gasparini, "3D Structured Light Scanner on the Smartphone", 13 Proc. Int'l Conf. on Image Analysis & Recognition 443-450 (Jul. 1, 2016) (Year: 2016).*

Xuefei Yin, Yanming Zu, & Jiankun Hu, "A Survey on 2D and 3D Contactless Fingerprint Biometrics: a Taxonomy, Review, and Future Directions", 2 IEEE Open J. of the Comp. Soc'y 370-381 (Oct. 2021) (Year: 2021).*

English-language translation of Written Opinion for PCT/EP2022/075498 (Dec. 19, 2022) (Year: 2022).*

Weigand Mario, "Was tun gegen Newton-Ringe auf H[alpha]-Aufnahmen der Sonne?", INTERSTELLARUM, Online: https://www.interstellarum.de/wp-content/uploads/2019/12/is99.pdf>, Sep. 18, 2015, Bd. 99, pp. 50-51, XP093005200, ISSN: 0946-9915, Erlangen, Germany.

English translation of ISR of WO2023046545.

* cited by examiner

CAMERA SYSTEM WITH INTERFERENCE PATTERN SUPPRESSION

CROSS REFERENCE TO RELATED APPLICATIONS

This application is a U.S. National Phase application under 35 U.S.C. § 371 of International Application No. PCT/EP2022/075498, filed on Sep. 14, 2022, and claims benefit to German Patent Application No. DE 10 2021 124 961.9, filed on Sep. 27, 2021. The International Application was published in German on Mar. 30, 2023 as WO 2023/046545 A1 under PCT Article 21(2).

FIELD

The present disclosure is related to a camera system with interference pattern suppression.

BACKGROUND

A camera system may experience an interference pattern. For example, constructive interference can create ring-shaped fringe patterns that negatively affect data and thus algorithms that use these data points.

SUMMARY

In an embodiment, the present disclosure provides a camera system that includes a sensor having a plurality of pixels sensitive to electromagnetic radiation; and an evaluator. The sensor is arranged behind a semi-transparent layer. The evaluator is configured to suppress an interference pattern occurring on the sensor by a pixel-by-pixel correction.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
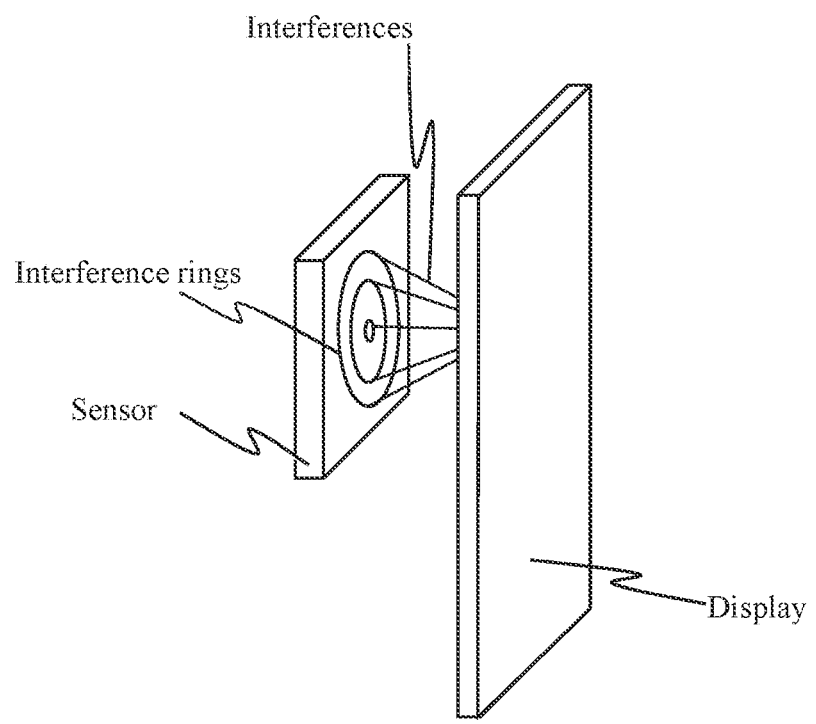
FIG. 1 shows an exemplary camera system according to the present disclosure with a sensor arranged behind a display.

Aspects of the present disclosure are based on the idea of the removal of interference fringes from data captured by a camera behind a semi-transparent layer (e.g. a display or cover glass). These fringes are caused by multiple reflections of light within one or more layers of the display. As mentioned above, constructive interference typically creates hereby ring-shaped fringe patterns that negatively affect data and thus algorithms that use these data points.

By applying a pixel-by-pixel correction, the fringes can be removed by offsetting the obtained data with a pixel-by-pixel correction matrix, which is either stored directly or reconstructed from parameters using a parameterized model.

Because the aforementioned interference rings change the data (such as the intensity) by a certain factor due to constructive or destructive interference, it is necessary to describe this factor as a function of the position on the pixel matrix. If the system has both an active illumination component (TX) and a receiving component (RX), two interference structures can occur depending on the baseline of the RX/TX component. The position of the interference pattern may depend on the distance to the observed object. A better correction can therefore be made if the distance of the object is known and a distance-dependent shift of the fringe pattern is applied.

The general procedure according to an aspect of the present disclosure consists of two steps, whereby the first step is a calibration step and only needs to be carried out once. The second step, the correction itself, should be carried out for each image.

The calibration can consist of the following steps, but is not limited to them:

Recording of at least one reference image, e.g. a flat white wall at a fixed distance (e.g. 1 m, ideally for different temperatures).

Determination of the center point(s) of the single or multiple ring-shaped interference patterns.

The latter step could be performed manually as it is a calibration step. The center point can correlate with the lens center, but it does not have to. Also other (semi-)automatic approaches for detecting circles and their center position, such as the Hough transform, could be used. Depending on the material properties, the center position and the radii of the rings can depend on the system temperature. A corresponding correction of the position values may therefore be necessary.

The reference images can, in certain circumstances, be stored in the camera as an image or parameterized.

The next step is the determination of the pixel-by-pixel correction factor. If the wall is homogeneously illuminated, these factors can be taken as the measured brightness value relative to the average brightness value of the image. If the wall is not homogeneous, the brightness ratio can be used with and without display. If the inhomogeneity is long-wave, this could also be done by dividing the high-pass image of a reference scene by its low-pass image. The low-pass image could be determined using a Gaussian filter. It may also be necessary to determine the temperature dependence of such a factor array.

To reduce the memory requirements of the calibration parameters, a parameterized model could be determined. An example of such a model could be, but is not limited to, a chirp signal or a LUT with stored radii and amplitudes. The parameters could be determined by calculating them based on the theoretical description of the interference pattern or by using curve-fitting algorithms. The approach can optionally consider lens effects directly, which leads to decreasing factors at larger radii due to lens blur effects.

The correction itself is based on a pixel-by-pixel correction matrix whose values are multiplied by the recorded data to obtain improved data with attenuated fringe patterns. This correction matrix could ideally be calculated once during the initialization phase of the camera if no temperature dependency is taken into account. Otherwise, the matrix would have to be updated at certain intervals. Each frame would then have to be multiplied by the matrix to remove the interference structures.

FIG. 1 shows an exemplary camera system according to an aspect of the present disclosure with a sensor arranged behind a display. The display is used, for example, to display information or images and is preferably configured as a semi-transparent layer. As mentioned at the beginning, interferences can occur in this arrangement due to the incoming light in the display, which then become noticeable as amplitude fluctuations on the sensor and are compensated for according to the invention.

Figure 2:
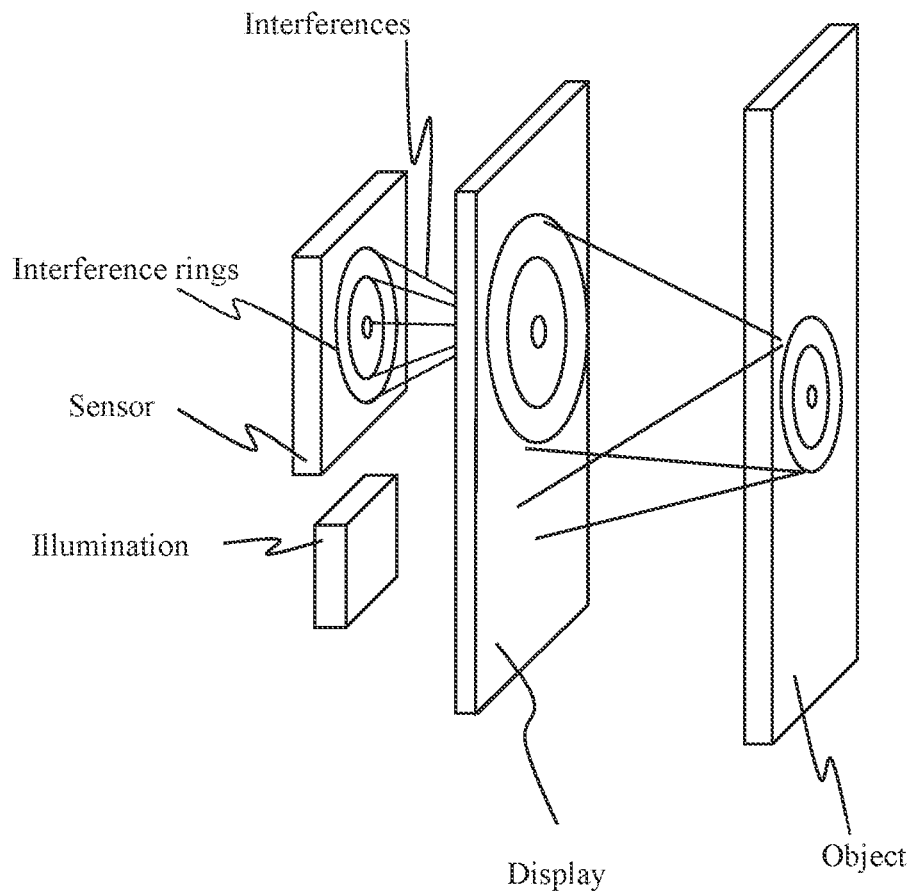
FIG. 2 shows another arrangement, in which, in addition, an illumination is arranged behind the display.

FIG. 2 shows another arrangement, in which, in addition, an illumination is arranged behind the display. The light penetrating the display may, in certain circumstances, also be affected by interference, so that the emitted light has an interference-affected amplitude profile in the scenery. According to the present disclosure, it is provided to compensate for this interference influence also.

Alternatively or additionally to the recorded reference images, it may also be provided to carry out an interference suppression using the images recorded during operation of the camera. Thus, for example, an interference-influenced amplitude curve present in the images can be determined and compensated for from a large number of recorded images.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A camera system, the camera system comprising:
a sensor having a plurality of pixels sensitive to electromagnetic radiation;
an evaluator; and
an illumination arranged behind a semi-transparent layer,
wherein the sensor is arranged behind the semi-transparent layer,
wherein the evaluator is configured to suppress an interference pattern occurring on the sensor by a pixel-by-pixel correction, and
wherein the interference pattern suppression or a correction matrix is configured to take into account distance-dependent interference patterns.

2. The camera system according to claim 1, wherein the interference pattern suppression is configured to take into account a temperature of the camera system.

3. The camera system according to claim 1, wherein the interference pattern suppression is configured to be carried out using reference images or their parameterization, whereby the reference images have been captured in advance in a reference measurement and map characteristics of the interference pattern.

4. The camera system according to claim 3, wherein the evaluator is configured to calculate the correction matrix for the interference pattern suppression using the reference images.

5. The camera system according to claim 3, wherein the reference images or their parameterization are recorded at different temperatures.

6. The camera system according to claim 1, wherein the interference pattern suppression is configured to take into account properties of the semi-transparent layer.

7. The camera system according to claim 1, wherein the interference pattern suppression is configured to calculate a pixel-by-pixel correction matrix at runtime based on the preceding images.

8. The camera system according to claim 1, wherein the sensor is configured as a depth sensor.

9. The camera system according to claim 1, wherein the sensor is configured as a 2D sensor, and
wherein the camera system additionally comprises a depth sensor.

10. The camera system according to claim 1, wherein the semi-transparent layer is configured as a display.

11. A mobile handheld device comprising the camera system according to claim 1.

* * * * *